(12) United States Patent  (10) Patent No.: US 6,608,001 B2
Allison  (45) Date of Patent: Aug. 19, 2003

(54) CATALYST AND METHOD OF MAKING MICROMETER SIZED SPHERICAL PARTICLES

(75) Inventor: Joe D. Allison, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 09/952,761

(22) Filed: Sep. 14, 2001

(65) Prior Publication Data

US 2002/0111262 A1 Aug. 15, 2002

Related U.S. Application Data

(60) Provisional application No. 60/233,060, filed on Sep. 14, 2000.

(51) Int. Cl.[7] .......................... B01J 21/08; B01J 23/36; B01J 23/75; B01F 1/00; C01G 51/04
(52) U.S. Cl. .................. 502/240; 502/241; 502/260; 502/314; 502/327; 423/27; 423/28; 423/68; 423/86; 423/98; 423/109; 423/132; 423/150.1; 423/280; 423/594; 423/605; 423/658.5
(58) Field of Search .................. 423/27, 28, 68, 423/86, 98, 109, 132, 150.1, 202, 658.5, 280, 594, 605; 502/240, 241, 260, 314, 327, 407, 415, 439, 527.19

(56) References Cited

U.S. PATENT DOCUMENTS

| | | | | |
|---|---|---|---|---|
| 2,620,314 A | | 12/1952 | Hoekstra | 252/448 |
| 3,872,217 A | | 3/1975 | Merz | 423/338 |
| 3,986,978 A | | 10/1976 | Michalko | 252/317 |
| 4,132,560 A | * | 1/1979 | Marquisee et al. | 106/288 B |
| 4,302,358 A | * | 11/1981 | Pellet et al. | 252/441 |
| 4,318,896 A | | 3/1982 | Schoonover | 423/628 |
| 4,329,260 A | | 5/1982 | Lester | 252/446 |
| 4,628,040 A | | 12/1986 | Green | 502/9 |
| 4,732,887 A | * | 3/1988 | Obanawa et al. | 502/402 |
| 4,766,101 A | | 8/1988 | Nortier | 502/164 |
| 4,767,523 A | * | 8/1988 | Kukes et al. | 208/217 |
| 4,902,666 A | | 2/1990 | Rainis | 502/439 |
| 5,166,121 A | * | 11/1992 | Khare et al. | 502/225 |
| 5,252,613 A | | 10/1993 | Chang | 518/700 |
| 5,376,449 A | * | 12/1994 | Harris et al. | 428/402 |
| 5,418,043 A | * | 5/1995 | Ogawa et al. | 428/195 |
| 5,426,082 A | * | 6/1995 | Marsden | 502/235 |
| 5,545,603 A | * | 8/1996 | Kemp | 502/347 |
| 5,663,385 A | * | 9/1997 | Kemp | 549/536 |
| 5,710,093 A | | 1/1998 | Rivas | 502/439 |
| 5,750,790 A | * | 5/1998 | King | 564/469 |
| 5,789,490 A | * | 8/1998 | Chang | 525/403 |
| 5,877,381 A | | 3/1999 | Sasaki | 585/658 |
| 6,100,304 A | | 8/2000 | Singleton | 518/715 |
| 6,235,677 B1 | | 5/2001 | Manzer | 502/232 |

FOREIGN PATENT DOCUMENTS

| | | | | |
|---|---|---|---|---|
| EP | 0318236 | 11/1988 | | C04B/38/00 |
| WO | WO 95/20558 | 8/1995 | | C07C/27/00 |
| WO | WO01/49607 A1 | 7/2001 | | C01B/37/00 |

OTHER PUBLICATIONS

PCT Search Report—PCT/US01/28814.

* cited by examiner

Primary Examiner—Cam N. Nguyen
(74) Attorney, Agent, or Firm—Conley Rose, P.C.

(57) ABSTRACT

A method for producing small spherical particles that are especially useful as catalysts and catalyst supports employed in chemical processes is disclosed. According to some embodiments, the method includes impregnating a porous support with a metal or metal oxide and dissolving the support to release spherical particles. In certain embodiments the support that is employed in the method comprises a number of spherical voids which determine the size of the spherical particles, and preferably have micrometer range diameters. One embodiment of an attrition resistant Fischer-Tropsch catalyst comprises a plurality of micrometer size spherical metal and/or metal oxide particles that are prepared according to the above-described method.

16 Claims, 6 Drawing Sheets

CATALYST AND METHOD OF MAKING MICROMETER SIZED SPHERICAL PARTICLES

CROSS-REFERENCE TO RELATED APPLICATIONS

This application claims the benefit under 35 U.S.C. § 119(e) of U.S. Provisional Patent Application No. 60/233,060 filed Sep. 14, 2000.

BACKGROUND OF THE INVENTION

1. Field of the Invention

The present invention generally relates to processes for shaping catalytic material as small spherical particles. The invention also relates to particulate catalysts and catalyst supports prepared by such process.

2. Description of Related Art

The physical and structural properties of a catalyst significantly influence its activity and durability. In many cases, the pore structure of the catalyst support, including size distribution and volume, determines the extent and accessibility of surface area available for contact of the catalytic material and the reactants. Catalytic activity often depends on the rate of diffusion of reactants and products in and out of the interstices of a catalyst. Increased pore size may facilitate the diffusion of reactants and reaction products, but catalytic activity is also a function of surface area and packing density, particularly with fixed bed particular catalysts. Spherically shaped catalyst particles have certain advantages over other shapes because they permit uniform packing so that variations in pressure drop are minimized and the tendency of a reactant stream to channel through the bed without effectively contacting the catalyst is reduced.

After a significant amount of use particulate catalysts and catalyst supports employed in a number of chemical processes tend to break down to smaller particles or fines. This is particularly problematic in fluid catalyst bed systems, where impacts experienced by the particles result in surface abrasion that produces fine particles which can be entrained in the stream of reactants. This usually contributes to a reduction in catalyst activity due to a loss of catalyst in the reactor. Better flow properties are generally obtained with spherical catalyst particles and catalyst attrition tends to be lessened compared to irregularly or non-spherically shaped particle beds.

U.S. Pat. No. 4,318,896 (Schoenover) discusses five general methods of preparing spheroidal particles of a size suitable for commercial operation. Of these, the spray drying method and the method of dropping particles into an oil bath are widely used. According to those methods, drops of a catalyst-forming liquid are produced and allowed to harden. In conventional spray drying techniques the droplet hardening takes place in a stream of air or in a water immiscible liquid such as oil.

A process for manufacturing silica particles is shown in U.S. Pat. No. 3,872,217. Processes for manufacturing alumina particles are shown, for example, in U.S. Pat. No. 4,318,896, and processes for manufacturing silica-alumina particles are described in U.S. Pat. No. 3,986,978. U.S. Pat. No. 2,620,314 (Hoekstra) describes a method for preparing a catalyst support, especially spheroidal alumina particles, by the oil-drop method.

U.S. Pat. No. 4,628,040 (Green) describes a method of making uniform spheroidal catalyst beads in which uniform droplets of a bead-forming liquid are produced by positioning the end of a capillary tube in the throat of a venturi. An immiscible fluid flowing through the venturi detaches the droplets from the end of the capillary tube to produce uniform, spherical droplets which harden into spheroidal beads of uniform size. This is contrasted with other oil-drop methods that initially form irregularly-shaped, non-uniformly sized particles which subsequently assume a spherical shape in the hot oil bath due to surface tension forces. Beads of alumina, silica alumina, and silica of about 200 microns or larger, up to ⅛ inch in diameter are disclosed and compared to typical beads produced in spray drying, which are said to have a diameter of 20 to 150 microns.

U.S. Pat. No. 4,902,666 (Rainis) describes a process for the manufacture of spheroidal bodies by selective agglomeration. These spheroidal particles can have either smooth surfaces or polylobe surfaces depending on the conditions of preparation. They have diameters generally between 1 to 5 mm and are useful as catalysts, or catalyst supports.

U.S. Pat. No. 5,710,093 (Rivas) describes a catalyst support comprising spherical particles of a mixture of at least two refractory inorganic oxides, refractory inorganic carbides, refractory inorganic nitrides, and mixtures of those compounds. The particles have a surface area of at least about 30 $m^2/g$, an average pore diameter of at least about 150 Å, and a particle size of at least about 0.1 mm.

U.S. Pat. No. 4,766,101 (Nortier, et al.) describes certain alumina-based catalyst carriers in the form of particles such as spheres, pellets, extrudates and crushed material. The durability of the carriers is improved by stabilizing them by impregnation with an aqueous solution containing silicon, in the form of the silicate ion, and nitrogen in the form of a quaternary ammonium ion, and then drying and activating the impregnated carriers by a calcination which decomposes the organic cation into volatile compounds which diffuse out of the carrier.

U.S. Pat. No. 5,877,381 (Sasaki, et al.) discusses the importance of maintaining a certain particle size distribution of the catalyst in order to maintain a good fluidized state in fluidized bed reactions for syntheses of organic compounds. It is suggested that the catalyst particles tend to be crushed or worn more easily if the particles have a finer particle size, so that the strength of particles having a smaller diameter is particularly important in reducing catalyst loss.

One type of industrial process in which particulate catalysts are employed is in a conventional Fischer-Tropsch process, in which carbon monoxide and hydrogen are converted via an exothermic reaction to the desired $C_2+$ hydrocarbon end products. The CO and $H_2$ reactant gas mixture is referred to as "syngas." The types and amounts of reaction products, i.e., the lengths of carbon chains, obtained via Fischer-Tropsch synthesis vary dependent upon process kinetics and the choice of catalyst. Slurry phase reactions, particularly those occurring in bubble columns are well-known in the art and have been thoroughly described in the literature for carrying out Fischer-Tropsch hydrogenation reactions. See, for example, Farley et al, The Institute of Petroleum, Vol. 50, No. 482, pp. 27–46, February (1984). In a three-phase slurry reactor a fluidized gas is introduced into a reactor containing catalyst particles slurried in liquid hydrocarbons within a reactor chamber, which is typically a tall column. Syngas is then introduced at the bottom of the column through a distributor plate, which produces small gas bubbles. The gas bubbles migrate up and through the column, causing a beneficial turbulence, while reacting in the presence of the catalyst to produce liquid and gaseous hydrocarbon products. Gaseous products are captured at the top of the reactor, while liquid products are recovered through a filter that separates the liquid hydrocarbons from the catalyst fines.

A variety of catalysts have been described in the literature for enhancing the efficiency and selectively of syngas to liquid hydrocarbons. One common type of catalyst used in Fischer-Tropsch synthesis is a cobalt-based catalyst prepared by loading of the catalytic material on a support using impregnation by incipient wetness or other well known techniques. For example, a titania, silica or alumina support may be impregnated with a cobalt nitrate salt solution, optionally followed or preceded by impregnation with a promoter material. Excess liquid is removed and the catalyst precursor is dried. Following drying, or during continued drying, the catalyst is calcined to convert the salt and promoter to the corresponding metal oxide(s). The oxide is then reduced by treatment with hydrogen or a hydrogen-containing gas for a period of time sufficient to substantially reduce the oxide to the elemental or catalytic form of the metal. Most conventional catalyst production methods do not provide uniform, spherical particles in the micrometer diameter size range (i.e., from less than 1 micrometer up to about 1000 micrometers), especially in the quantities needed for industrial scale use.

U.S. Pat. No. 6,100,304 (Singleton, et al.) describes cobalt and a palladium promoter supported on gamma-alumina or doped gamma-alumina for catalyzing Fischer-Tropsch synthesis in a slurry bubble column reactor. The source of the alumina and the pretreatment procedures used are said to play major roles in determining the performance of the resulting cobalt-based Fischer-Tropsch catalysts. The disclosed spheroidal shaped alumina supports have an average particle size ranging from about 10 to about 150 $\mu$m, a BET surface area, after calcination, ranging from about 200 to about 260 m$^2$/g; and may include about 0–1000 ppm titanium added prior to crystallization. The resulting cobalt-based catalysts are said to be much more attrition resistant than cobalt catalysts utilizing other types of oxide supports (e.g, silica), even when those other supports are spheroidal. Additional improvement in attrition resistance is said to be obtained by incorporating a lanthana (La$_2$O$_3$) promoter.

U.S. Pat. No. 5,252,613 (Chang et al.), which describes a method for obtaining enhanced catalyst mixing in slurry bubble columns, states that catalyst particle sizes may range from that which is reasonably filterable to that which is reasonably able to be dispersed in a slurry phase. Particle sizes of 1–200 microns, preferably about 20 to 150 microns are said to meet these requirements.

Despite the prior art disclosures there still remains a need for a practical method of producing small, spherical particles for use in applications requiring micrometer diameter range particles with enhanced resistance to abrasion. One such application is in the manufacturing of more catalytically active, attrition resistant particles for use in catalyzing chemical reactions such as the hydrogenation of carbon monoxide in a slurry bubble column Fischer-Tropsch process.

SUMMARY OF THE INVENTION

The present invention overcomes many of the problems encountered with prior art particles that are employed as catalysts or catalyst supports, and provides a new method of making spherical or substantially spherical particles that are especially suited for use as catalysts and catalyst supports. As used herein, the term "substantially spherical" means regularly shaped, rounded particles that resemble spheres. According to certain embodiments of the invention, a new method for producing small spherical particles that are especially useful as attrition resistant catalysts and catalyst supports employed in chemical processes is provided. In accordance with certain embodiments of the invention, a method of making at least one spherical particle comprises loading or impregnating a support with a metal and/or metal oxide and then dissolving the support, whereby separate spherical particles are released. The support comprises a material that is labile to a selected treatment, and the catalytic metal or metal oxide is stable, or at least substantially stable, to the same treatment, which in certain embodiments, is an acid or alkali treatment. As used herein the term "substantially stable" means that the catalyst metal or metal oxide does not chemically or physically deteriorate under the specified treatment conditions over a specified period of time. The support may be in the form of particulates or a monolith prior to the support-dissolving treatment, and contains at least one spherical or substantially spherical void. In some embodiments, there are voids in the support with a diameter in the range of about 0.1 to 10 microns, preferably about 2 microns. In certain embodiments the method also includes treating the loaded support with an alkali or an acid.

Also in accordance with the invention is provided a spherical particle having a micrometer range diameter, comprising at least one metal or metal oxide, and prepared as described above. In certain preferred embodiments the spherical particle is an attrition resistant catalyst particle or particulate catalyst support made by impregnating a support with a solution comprising at least one decomposable metal salt, to yield a supported catalyst precursor. The support contains a plurality of spherical or at least substantially spherical voids. The catalyst precursor is then calcined and, optionally, may be reimpregnated with a second solution comprising at least one decomposable metal salt and calcined. The support is then dissolved in such a way that a plurality of spherical metal and/or metal oxide particles having activity for catalyzing a defined chemical reaction are released from the support. The free spherical particles are then harvested for use as a catalyst or catalyst support. In certain preferred embodiments the method of making the catalyst or catalyst support particle comprises choosing a support having a number of spherical or substantially spherical voids, such as a silica-containing material.

Certain embodiments of the invention provide a particulate catalyst comprising a plurality of micrometer range diameter spherical particles prepared by impregnating a support with a metal or metal oxide having activity for catalyzing a desired chemical reaction. Preferably the support that is chosen comprises a plurality of substantially spherical voids. The impregnated support is then dissolved, releasing the particles which, in certain embodiments comprise at least about 10% spherically shaped particles. In some embodiments the diameter ranges from about 0.1 to 10 microns, and in some preferred embodiments the particles have an average diameter of about 2 microns.

Also provided by the present invention are chemical processes employing the new spherical catalyst particles or catalyst supports. One such process comprises a process for synthesizing C$_2$+ hydrocarbon products comprising contacting a feedstock comprising CO and H$_2$ with a particulate catalyst under Fischer-Tropsch hydrogenation reaction promoting conditions. The catalyst comprises a plurality of spherical particles prepared by impregnating a support with a solution comprising at least one decomposable metal salt, to yield a supported catalyst precursor. The catalyst precursor is then calcined and, optionally, may be reimpregnated with a second solution comprising at least one decomposable metal salt and calcined. The support is then dissolved in such a way that a plurality of spherical metal and/or metal oxide particles having activity for catalyzing a defined chemical reaction are released from the support. The free spherical particles are then harvested for use as a particulate catalyst. In certain alternative embodiments, the spherical particles themselves have little or no catalytic activity in the Fischer-Tropsch reaction, in which case the particles serve as a catalyst support for a more catalytically active material that is applied to the particles. Still other embodiments and advantages of the present invention will appear from the following description.

DETAILED DESCRIPTION OF PREFERRED EMBODIMENTS

The following examples describe procedures for preparing particulate catalysts that are catalytically active for Fischer-Tropsch synthesis. It will be readily appreciated, however, that the general procedure for producing small spherical particles are also applicable to the production of catalysts and catalyst supports for use in a multiplicity of chemical processes or other applications where quantities of small spherical metal particles are needed.

EXAMPLE 1

Co—Re—B Fischer-Tropsch Catalyst Prepared by NaOH Treatment

A catalyst that is active for catalyzing a Fischer-Tropsch reaction is prepared by first supporting the desired metals and promoters on a $SiO_2$ support. The support can be either a powder or a 3D structure or monolith having the desired pore/cell size and concentration to achieve the desired spherical size. Silica gel, such as that supplied by Aldrich Chemical (~500 $m^2$/g) was impregnated via the incipient wetness technique with a solution of cobalt nitrate, to which perrhenic acid and boron oxide had been added. This yielded a silica supported catalyst containing approximately 20 wt % cobalt, 0.5 wt % rhenium and 1 wt % boron, the remainder being silica. The metal salts were calcined at 400° C. to form the corresponding oxides, after which the catalyst was treated to dissolve the $SiO_2$ support. This is accomplished by using a solution of NaOH or KOH. In particular for this example, the catalyst was suspended in a 20% KOH aqueous solution at 85° C. and stirred for two hours. The resulting suspension was filtered through a 0.45 micron Teflon™ filter and washed three times with de-ionized water. The post-calcination alkali treatment yielded a fine powder. The weight loss after the treatment indicates complete dissolution of the silica content of the original supported catalyst to yield particles comprising about 93% cobalt, about 2.3% rhenium and about 4.7% boron.

Figure 1:
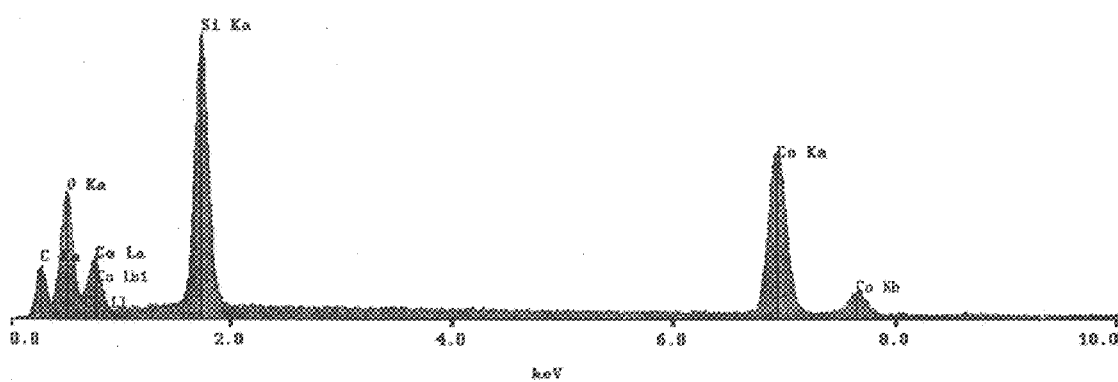
FIG. 1 is an x-ray diffraction plot for one embodiment of an untreated silica supported catalyst.
Figure 2:
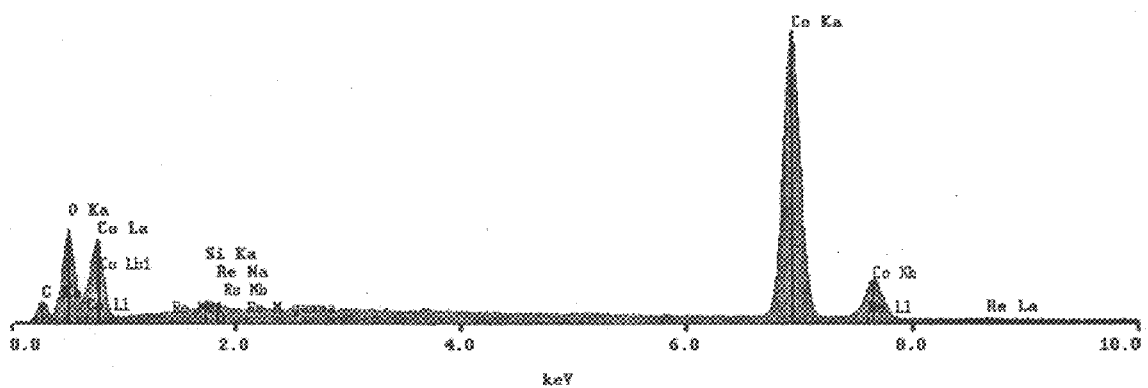
FIG. 2 is a similar plot obtain after NaOH treatment of the sample.
Figure 3A:
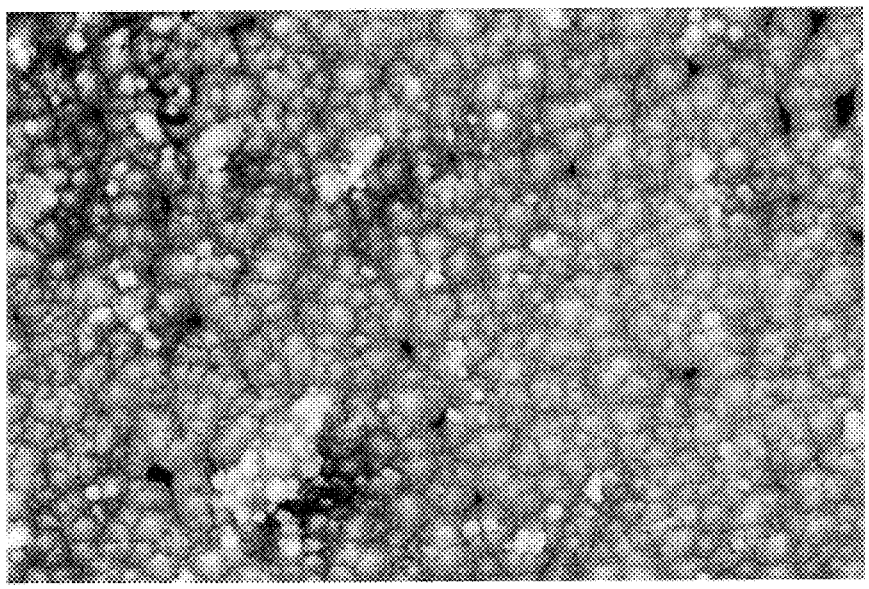
FIG. 3A is a scanning electron micrograph of one embodiment of an untreated metal—metal oxide loaded support taken at ×5000 magnification.
Figure 3B:
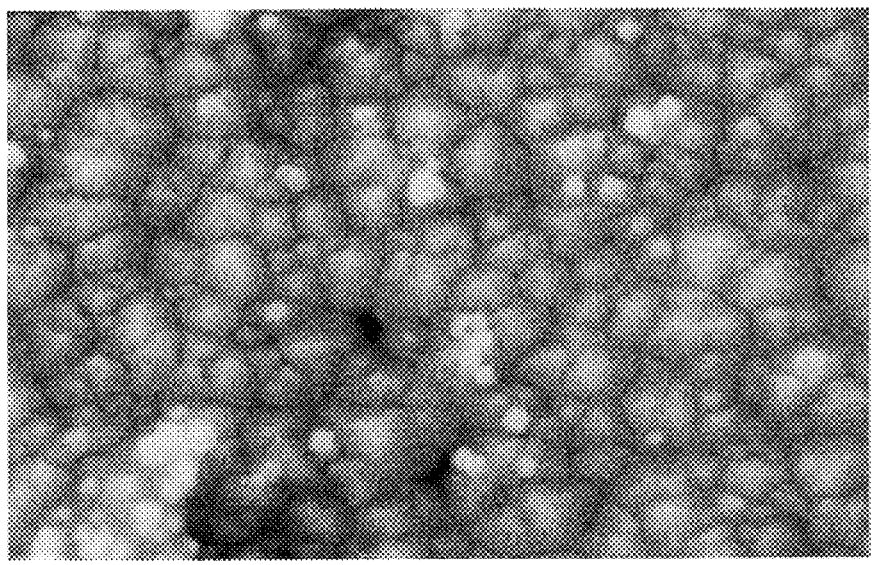
FIG. 3B is a scanning electron micrograph of the same sample shown in FIG. 3A, taken at increased magnification (×10,000).

Samples of the particles were examined by scanning electron microscopy (SEM) and x-ray fluorescence (XRF). The XRF plot for the untreated silica supported catalyst is shown in FIG. 1, in which Si, as well as the added Co, are clearly present. In FIG. 2, which is a similar plot for the KOH treated sample, the cobalt band remains but the Si band is absent. SEM examination of the untreated sample at ×5000 magnification (FIG. 3A) shows large, closely packed agglomerated particles of metal loaded $SiO_2$. As shown in FIG. 3B, at increased magnification (×10,000) the interior of these relatively large irregularly shaped particles consists of what appear to be agglomerated spheres. Although not wishing to be limited to a particular theory, the rounded particles are believed to arise because the interior pores or voids are spherical and serve as a mold or template for the impregnated material.

Figure 4A:
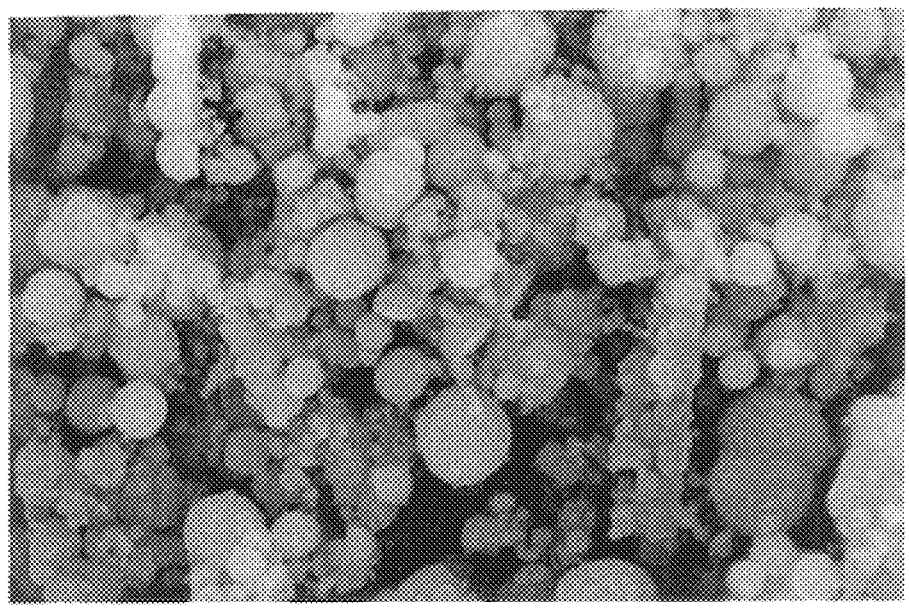
FIG. 4A is a scanning electron micrograph of a NaOH-treated metal—metal oxide loaded support (×5000), showing exposed metal or metal oxide particles.
Figure 4B:
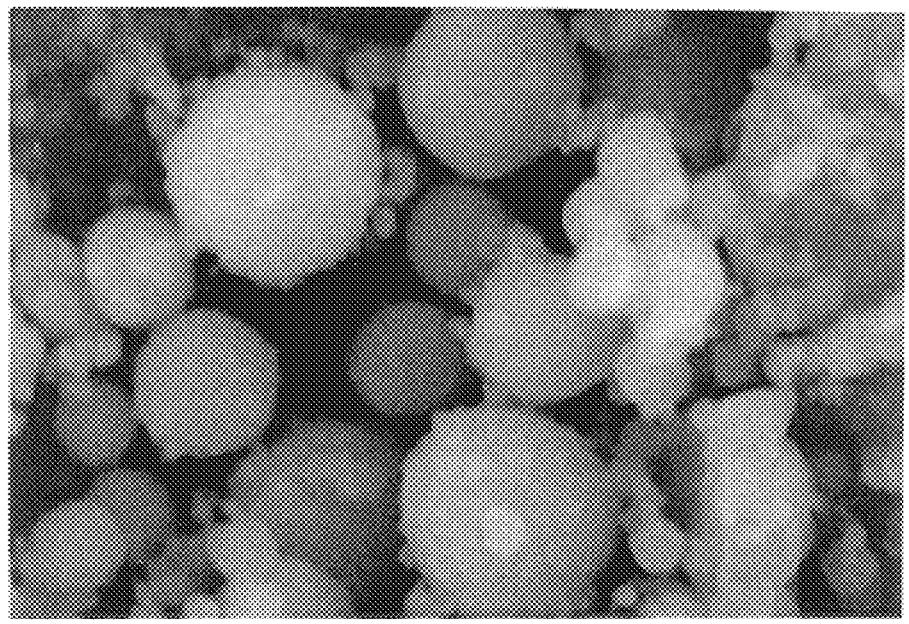
FIG. 4B is a scanning electron micrograph of the same NaOH-treated sample shown in FIG. 4A, taken at increased magnification (×10,000).
Figure 5:
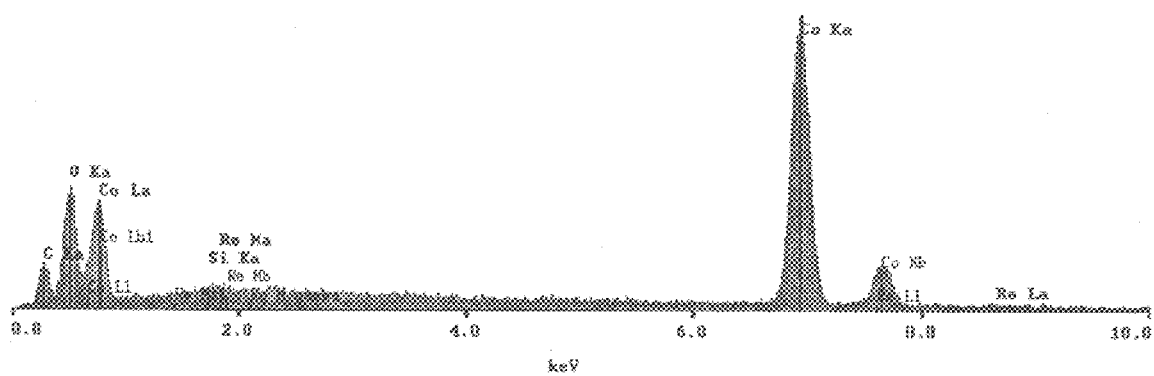
FIG. 5 is an x-ray diffraction plot for one embodiment of a HF-treated silica supported catalyst.
Figure 6:
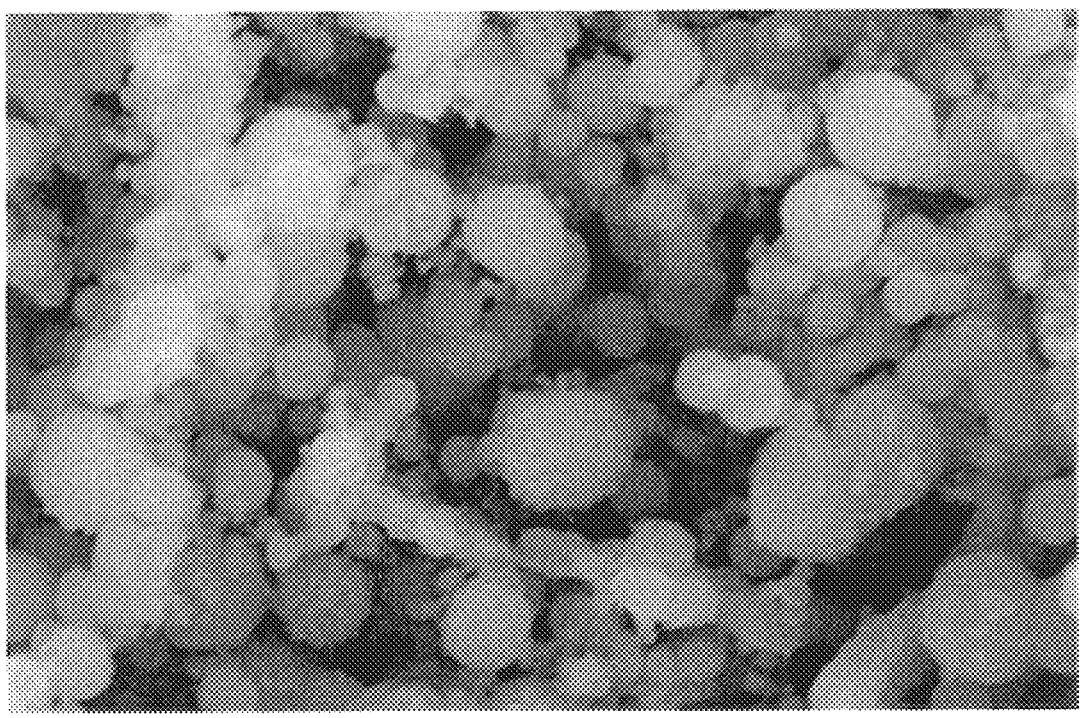
FIG. 6 is a scanning electron micrograph of a hydrogen fluoride-treated metal—metal oxide loaded support (×5000), showing exposed metal or metal oxide particles.

Dissolution of the $SiO_2$ by the KOH treatment exposes the metal oxide particles. As can be seen in the SEM images shown in FIGS. 4A–B, the resulting metal or metal oxide particles have assumed the reverse form of the $SiO_2$ surfaces and the interior pores. In the KOH treated sample, the absence of the large flat-faced particles at ×5000 (FIG. 4A) is apparent. The fine particles that make up the sample show both spherical and flat particles, which reflect the two types of metal particles that are formed on the $SiO_2$ support. The flat particles are due to the exterior metal loading on the flat outer surfaces of the $SiO_2$ support. The interior spheres were also exposed, however, due to the alkali treatment. The freed spherical particles are in plain view at ×10,000 (FIG. 4B). The spheres are not agglomerated and have surprising symmetry. At this point, the catalyst can be reduced for introduction into a conventional slurry bubble column reactor. In the present example, employing a silica gel template, the approximate diameters of the resulting particles range from about 0.2 to about 3 microns. The diameter range may be different, however, depending on the template material that is used. Any suitable material that provides a spherical template for particle formation and is capable of being dissolved away from the catalyst particles could be employed. For the purposes of this disclosure, references to "dissolving" a support means causing at least one component material to pass into solution, to be reduced to liquid form, or to be dispelled such that the support breaks apart or disintegrates so that the spherical particles contained by said support are released. The above-described protocol is suitable for use as a general treatment of supported metal catalysts to form high surface area, spherical particles. This process will greatly increase the surface area of the catalyst.

EXAMPLE 2

Co—Re—B Fischer-Tropsch Catalyst Prepared by HF Treatment

The same procedure was followed as in Example 1 except that, instead of treating the supported catalyst with an alkaline solution, the $SiO_2$ was removed with hydrofluoric acid (25% HF in de-ionized water, stirring at room temperature for one hour) to produce a population of spherical catalyst particles comprising about 93% cobalt, about 2.3% rhenium and about 4.7% boron.

COMPARATIVE EXAMPLE

Untreated Co—Re—B Fischer-Tropsch Catalyst

A comparative catalyst was prepared as described in Example 1 except that the silica gel supported catalyst was not treated with an alkaline solution or with hydrofluoric acid.

Samples of the treated and untreated catalysts were studied under Fischer-Tropsch reactor conditions to determine activity. The results are shown in Table 1.

Fischer-Tropsch Test Procedure

The exemplified catalyst preparations were evaluated for their ability to catalyze the hydrogenation of carbon monoxide to saturated hydrocarbons (Fischer-Tropsch, or F-T, reaction) in a simplified reactor system designed specifically for catalyst screening. Any suitable F-T reactor system could be used and would provide similar results. For example, U.S. Pat. No. 6,235,677 describes a suitable F-T system for catalyst evaluation, the disclosure of which is incorporated herein by reference. An appropriate amount of F-T catalyst sample was loaded into the pressure vessel, which was then raised to reaction pressure with an atmosphere of synthesis gas (a mixture of CO and $H_2$). The vessel was then heated to reaction temperature and the decrease in vessel pressure (indicative of F-T reaction) was monitored. After a specific time period, gas chromatography analysis of both the vessel headspace and produced liquids was performed. From these measurements conversion of carbon monoxide was determined. Table 1 compares the CO conversion of the catalyst prior to treatment and the post-treatment spherical catalysts, tested under the same reaction conditions.

TABLE 1

Activity of Cobalt-Rhenium-Boron Particulate Catalysts

| | Carbon Monoxide Conversion (%) |
|---|---|
| Prior to Treatment | 49 |
| Spherical Particles KOH Treatment | 63 |
| Spherical Particles HF Treatment | 57 |

Higher catalytic performance was observed with the cobalt-rhenium-boron spherical particles compared to that of the same weight of cobalt-rhenium-boron supported on untreated silica gel (based on total weight of supported catalyst), as shown in Table 1.

While the preferred embodiments of the invention have been shown and described, modifications thereof can be made by one skilled in the art without departing from the spirit and teachings of the invention. For example, a particle composition known to have good activity for Fischer-Tropsch synthesis processes is detailed in the examples. One can readily appreciate, however, that a wide variety of other particle compositions can be prepared similarly, based on known chemical compositions possessing known catalytic activity. Such new spherical particles would also be expected to provide enhanced resistance to attrition when substituted for a corresponding particulate catalyst in any existing chemical process. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims. The disclosure of U.S. Provisional Patent Application No. 60/233,060 filed Sep. 14, 2000 is hereby incorporated herein by reference. The disclosures of all patents, patent applications and publications cited herein are incorporated by reference. The discussion of certain references in the Description of Related Art, above, is not an admission that they are prior art to the present invention, especially any references that may have a publication date after the priority date of this application.

What is claimed is:

1. A method of making at least one spherical particle comprising:

loading a support with at least one metal and/or metal oxide, said support comprising a material that is capable of being dissolved away from said metal or metal oxide; and dissolving said support material.

2. The method of claim 1 further comprising selecting a support comprising at least one substantially spherical void.

3. The method of claim 2 wherein said at least one void has a diameter in the range of about 0.1 to 10 microns.

4. The method of claim 3 wherein said diameter is about 2 microns.

5. The method of claim 1 further comprising selecting a support having a structure chosen from the group consisting of particulates and monoliths.

6. The method of claim 1 further comprising selecting a support comprising an acid- or alkali-labile material.

7. The method of claim 6 wherein said dissolving comprises treating said loaded support with an alkali.

8. The method of claim 7 wherein said alkali comprises NaOH or KOH.

9. The method of claim 6 wherein said dissolving comprises treating said metal and/or metal oxide loaded support with an acid.

10. The method of claim 9 wherein said acid comprises HF.

11. The method of claim 1 comprising:

impregnating said support with a solution comprising at least one decomposable metal salt, to yield a supported metal or metal oxide precursor, said support containing a plurality of spherical voids;

calcining said precursor such that a metal and/or metal oxide loaded support is obtained;

optionally, reimpregnating said loaded support with a second solution comprising at least one decomposable metal salt to provide a reimpregnated loaded support and calcining said reimpregnated loaded support;

dissolving said support such chat a plurality of spherical metal and/or metal oxide particles are released from said support; and harvesting said particles.

12. The method of claim 11 wherein at least 10% of said particles are spherical.

13. The method of claim 1 wherein said support comprises silica.

14. A spherical particle prepared according to the method of claim 1 having a micrometer range diameter.

15. The particle of claim 14 wherein said diameter is in the range of about 0.1 to 10 microns.

16. The particle of claim 15 wherein said diameter is about 2 microns.

* * * * *